Patented Aug. 2, 1938

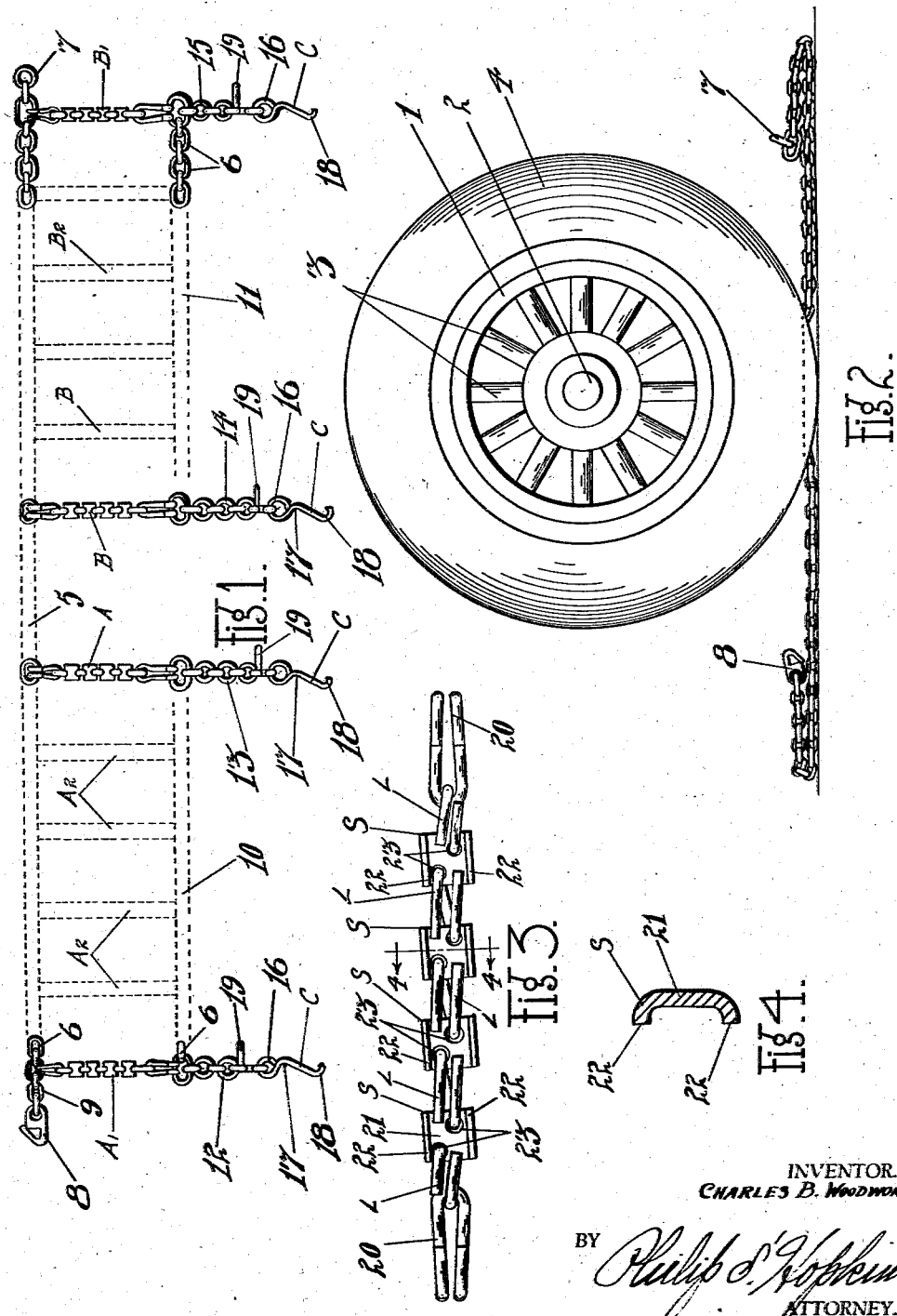

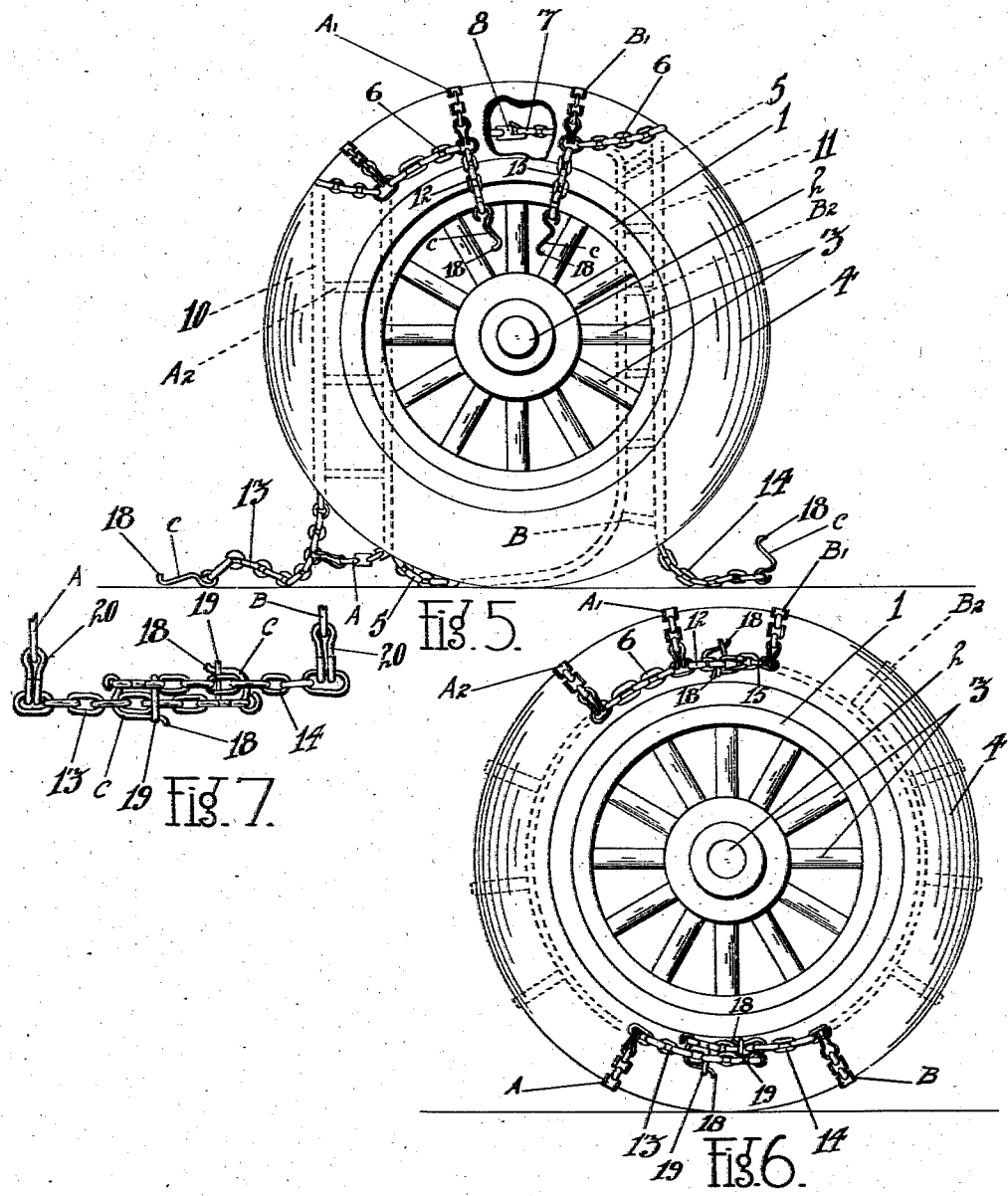

2,125,705

UNITED STATES PATENT OFFICE 2,125,705

TIRE CHAIN

Charles B. Woodworth, Port Dickinson, N. Y.

Application January 24, 1935, Serial No. 3,296

1 Claim. (Cl. 152—213)

My invention relates to tire chains and has for its primary object the provision of an anti-skid or traction device for vehicles which may be applied to a wheel without moving the wheel either by jacking it up away from its support or by rolling the wheel on to the device as is customary and required by the type of tire chain commonly in use.

My improved chain can be placed upon a wheel while the same is stationary on the ground or other support and without the necessity of reaching over or behind the wheel in order to secure the same in position.

A further object of my invention lies in the provision of a fastening means for the connecting ends of the chain which permits ready adjustment and eliminates to a great extent the noise and rattle of the chain when the vehicle is moving.

A further object lies in the provision of a cross chain for engagement with the tread of the wheel and with the ground or other supporting surface which combines both improved traction means and long life or wear as compared with the conventional type of cross chain.

Other objects and advantages will be apparent as the description proceeds, reference now being had to the figures of the accompanying drawings forming a part of this application and wherein like reference numerals indicate like parts.

In the drawings:

Figure 1 is a view of my improved tire chain spread out in flat arrangement to illustrate clearly the construction thereof.

Figure 2 is a side view of a vehicle wheel and tire with my improved chain shown in the first position of application thereto.

Figure 3 is a detail view of my improved cross chain.

Figure 4 is a detail sectional view of one of the elements of the cross chain, taken on the line 4—4 of Figure 3.

Figure 5 is a side view of a tired wheel with the chain partly applied thereto, the tire being broken away at one point for clearness of illustration.

Figure 6 is a side view of a tired wheel with the chain completely assembled thereon.

Figure 7 is a detail enlarged view illustrating clearly the fastening means for the end portions of the same.

For the purpose of definition and clearness, reference will hereafter be made to the "outside" and "inside" of the wheel and to the "outside" and "inside" portions of the chain. By the "outside" of the wheel is meant that side away from the vehicle to which it is secured and therefore readily accessible. The "inside" of the wheel refers to the side toward the vehicle, adjacent the fenders and from the center of which the axle or other supporting means extends. This "inside" of the wheel is normally very inaccessible.

The "inside" of the tire chain refers to that length thereof which extends around the wheel on the inside next to the vehicle. The "outside" of the chain refers to that length which extends around the wheel on the outside thereof. The "inside" and "outside" portions of the chain are connected by cross chains consisting of short lengths secured to the side lengths and directly overlying the periphery of the wheel.

It will be understood at the outset that although I have shown and will describe my invention in cooperation with an ordinary automobile wheel provided with the usual pneumatic tire, the same is not limited specifically thereto as obviously it is adaptable for other types of wheels and vehicles. Therefore, the use of the term "tire chain" as used in the specification and claims is to be understood in its broadest sense.

With the foregoing definitions of terms in mind, the reference character 1 refers to a wheel supported upon the usual hub or axle 2 by the spokes 3, or other suitable means. Mounted upon the wheel in the usual manner is a tire 4 supported upon the ground or other surface and which in turn supports the vehicle. In the Figures 2, 5 and 6, in which the wheel is shown, the view is taken toward the outside of the wheel.

As is well known that for a tire chain to be effective for anti-skid or traction purposes, and in order that it will not slip off the wheel during use, the same must be secured around the wheel with cross chains engaging the periphery of the wheel for substantially its entire circumference. With the usual type of tire chain in common use, it has been necessary in order to accomplish this required mounting, that either the wheel be jacked up away from its supporting surface in order that the portion of the tire chain which fits at the bottom of the wheel, that is, the part which contacts the ground, may be slipped thereunder, or the chains laid flat upon the ground and the wheels rolled thereon. It often occurs that both of these operations are either impossible or very difficult due to the condition of the ground or supporting surface. Likewise with such conventional type of chain, it is necessary that the operator in securing the same in position must reach over and behind the wheel to secure the ends of the inside portion of the chain together. This is often a difficult and disagreeable task.

Also, on most automobiles of modern construction the fenders are designed for a close fit over the tire, which renders even more inaccessible the "inside" of the wheel.

By my improved chain construction these operations are unnecessary and the same may be quickly and easily applied to the wheel without raising the same or moving the same circumferentially. Likewise all of the fastening and securing of the chain may be done on the outside of the wheel in an easily accessible position.

My improved chain comprises a continuous inside length 5 of proper length and consisting of interconnected links 6 of any desired shape or construction. At one end of the inside length 5 of the chain, there are provided one or more free links 7 and at the opposite end of this inside length 5 there is provided a suitable fastener 8 of any desired construction and type but preferably of the simple snap fastener design common in the art. This fastener 8 is secured to the end by a few free links 9 forming the extreme end of the inside length 5. The fastener 8 is adapted to be attached to and cooperate with a selected one of the free links 7 at the opposite end of the inside length 5 whereby to complete the circle formed by this inside length when the same is in position upon the wheel.

The outside of the chain is divided into two lengths 10 and 11 and each consists of the same interconnected links 6.

At points spaced on either side of the center of the inside length 5 of the chain are cross chains indicated generally as A and B in Figure 1. The details of these cross chains will be more specifically described as the description proceeds. The cross chain A is secured at one end to the inside length 5 and at its opposite end to one end of the outside length 10. The cross chain B is secured at one end to the inside length 5 and at its opposite end to one end of the outside length 11. The opposite end of the outside length 10 also has secured thereto one end of a cross chain A—1, the opposite end of which is secured to the adjacent end of the inside length 5. Likewise the opposite end of the outside length 11 has secured thereto one end of a cross chain B—1, the opposite end of which is secured to the adjacent end of the inside length 5.

Still referring to Figure 1, it will be noted that at equally spaced intervals between the cross chains A and A—1 there are provided additional cross chains A—2 connecting the inside length 5 and the outside length 10. Likewise between the cross chains B and B—1 are positioned at spaced intervals additional cross chains B—2. The cross chains A, A—1, A—2, and B, B—1, and B—2 are all identical in construction and are dotted in Figure 1 for clearness of identification.

The number of free links 7 at one end of the inner portion 5, and the number of links 9 at the opposite end of the inner portion 5 and between such end and the fastener 8, are so arranged that when the fastener 8 is secured to the end link 7 in position on the wheel, the cross chains A—1 and B—1 will be spaced apart substantially the same distance as the spacing between the cross chains B—2 and the cross chains A—2. The spacing between the cross chains A and B on opposite sides of the center of the chain, is slightly greater than the spacing between the other cross chains. The purpose of this additional spacing at this point will be apparent as the description proceeds.

Secured to both ends of both the outside lengths 10 and 11 and in alignment respectively with the cross chains A—1, A, B and B—1 are short chain sections 12, 13, 14 and 15 respectively. These sections are made up of interconnected links identical with the links 6. The free ends of each of these sections are provided with identical fastening means indicated generally at C and consisting of an eyelet portion 16, by which the fasteners are secured to the end links of the sections, a bight portion or bend 17 and a retaining hook portion 18. Each of the sections 12, 13, 14 and 15 is provided adjacent its free end with a loose laterally extending loop or link 19 with which the hook portion 18 of the fastening means cooperates in a manner to be described.

It will be understood that when the chain is in position upon the wheel the sections 13 and 14 will be secured together by means of the fasteners described, to thus connect the outside lengths 10 and 11 and provide them as a continuous length on the outside of the wheel corresponding to the continuous inside length 5 of the chain. Likewise it will be understood that the sections 12 and 15 will be similarly connected together at a point opposite the connected free ends of the inner length 5.

In connecting the sections 13 and 14 together or the sections 12 and 15 together, the fastener C of one section is placed through the selected link of the other section and turned to bring such link into the bight portion 17 of the fastener. The hook portion of the fastener is then placed through the adjacent loop or link 19 of the chain section to which the fastener C is secured. The fastener C of the other section is then similarly passed through the selected link of the first section and turned to bring such link into the bight portion 17 of the fastener, the hook portion 18 of the fastener then being placed within the adjacent loop or link 19 to retain the same in position. It is extremely important that in securing the sections 13 and 14 together in this manner and also the sections 12 and 15, that the selected links of these sections through which the fasteners pass, be the same distance from the ends of the sections which are secured to the lengths 10 and 11. In other words, if the fastener C of the section 13, for instance, is passed through the third link of the section 14, counting from the length 11 and cross chain B, then the fastener C of this section 14 should also be passed through the third link of section 13, counting from the length 10 and cross chain A. This is in order to prevent any looseness of the chain at this point of connection, with consequent rattling and likelihood of becoming unfastened. Obviously any of the links of the sections may be selected to accommodate the space necessary between the cross chains A and B due to the condition of the wheel upon the ground, but such selection should always be the same for each section. In this way, an adjustment is possible for the tightness of the chain around the wheel and this is desirable due to the different conditions of tire inflation and difference in makes and sizes of tires which may be encountered and also due to the relative position of the tire upon the ground. For instance, in some cases the wheel may be somewhat embedded in soft ground making it necessary to provide at the outset a greater spacing between the cross chains A and B than when the ground is hard and the wheel sets up thereon.

In Figure 7 I have illustrated in detail the specific method of securing the loose sections of the chain together by the fastening device C.

With reference now to Figures 3 and 4 it will be noted that the cross chains A, A—1, A—2, B, B—1, and B—2, comprise the end hooks 20 of conventional type for securing the same to the links of the chain portions 5, 10 and 11. Instead of the usual links provided for cross chains, however, I have provided a series of flanged shoes indicated generally at S, connected in spaced relation by links L.

The shoes S may be made of metal, rubber, or other suitable material and comprise the flat body portion 21 adapted to engage against the periphery of the tire 4. At two opposite sides the body portion 21 is flanged outwardly as at 22 to provide road engaging portions.

The body portions 21 are provided with suitably disposed openings 23 to receive the links L. These links L comprise a single length of wire-like material, one end of which passes through an opening in one of the shoes S and is bent over so that its end engages between the flanges 22 of the next adjacent shoe. The middle portion of the link is bent parallel with the shoes S and at a slight angle in order that its opposite end may pass through the opening on the opposite side of the adjacent shoe where such end is then bent back toward the first named shoe parallel to the other end of said link and engaging between the flanges 22 of said first named shoe. This is clearly illustrated in Figure 3.

The length of the flanges 22 of the shoes S is substantially the same as the thickness of the ends of the link lying between such flanges whereby in normal operation the ground is engaged by both the links and the flanges. The relatively loose connection between the links and shoes, however, results in a slight tilting of the shoes in the event of the moving wheel becoming locked while in motion, as by the application of the brakes of the vehicle. This obviously results in the flanges on one side of the cross chain digging into the ground or supporting surface, thus providing a very effective non-skid surface. The action of the cross chains under such circumstances is clearly illustrated in applicant's prior Patent No. 1,523,330 dated January 13, 1925.

The application of this improved tire chain to a vehicle wheel will now be described. Assuming the wheel to be supported directly upon the ground, the operator takes the chain in the condition shown in Figure 1 and holding one end of it throws the chain around the inside of the wheel beneath the axle with the opposite ends of the chain extending on either side of the wheel as shown clearly in Figure 2. He next takes hold of the fastener 8 at one end of the inside length 5, in one hand, and the links 7 at the opposite end of the inside length 5 in the other hand, and lifts the chain upwardly toward the top of the wheel, bringing the fastener 8 and links 7 toward him to the outside of the wheel and over the top thereof, where they may be snapped together with ease and convenience. Next he takes hold of the section 12 with one hand and section 15 with the other hand, having in the meantime returned the fastened ends 8 and 7 back to the inside of the wheel at the top to the position shown clearly in Figure 5. He then secures the sections 12 and 15 together on the outside of the wheel at a point opposite the fastener 8 and links 7, utilizing the fasteners C in the manner heretofore described. The chain may now be readily and easily adjusted from the dotted line position shown in Figure 5 to its normal position on the wheel with the cross chains engaging over the periphery of the tire. It will be noted that in this position of adjustment, the cross chains A and B are located directly on either side of the point at which the tire engages the road. The operator now completes the operation by securing together on the outside of the tire and at the bottom, the sections 13 and 14, utilizing the fasteners C as heretofore described.

Thus the chain is quickly and readily applied to the wheel without moving the wheel either by lifting it or rolling it.

It will thus be seen that I have provided a distinct improvement in tire chains both in construction permitting the application of a chain to a stationary wheel on the ground and also in the type of cross chain designed to give longer wearing and better traction advantages.

Of course, changes may be made in details of construction and arrangement of parts without departing from the spirit and scope of my invention. I do not limit myself, therefore, to the exact form herein shown and described other than by the appended claim.

I claim:

A tire chain comprising a continuous inner side section of interconnected links, means at the ends of the section for securing the same together, an outer side section including two separated lengths of interconnected links, the ends of each of the lengths being provided with additional lengths of interconnected links, the additional links on the relatively outer ends of the separated lengths providing means for locating the outer side section on the outside of a tire, fastening means at the ends of each of said additional lengths for connection with the links of adjacent additional lengths whereby to interconnect the ends of the separated lengths of the outer side sections following location of the side sections on the tire, and cross links extending between the side sections.

CHARLES B. WOODWORTH.